(12) United States Patent
Kumano et al.

(10) Patent No.: US 11,021,149 B2
(45) Date of Patent: Jun. 1, 2021

(54) DRIVING SUPPORT APPARATUS

(71) Applicant: DENSO CORPORATION, Kariya (JP)

(72) Inventors: Shunya Kumano, Nisshin (JP); Shunsuke Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 240 days.

(21) Appl. No.: 16/150,605

(22) Filed: Oct. 3, 2018

(65) Prior Publication Data

US 2019/0100201 A1  Apr. 4, 2019

(30) Foreign Application Priority Data

Oct. 4, 2017 (JP) .............................. JP2017-194558

(51) Int. Cl.
| | |
|---|---|
| *B60W 10/04* | (2006.01) |
| *B60W 10/20* | (2006.01) |
| *B60W 30/12* | (2020.01) |
| *B60W 50/04* | (2006.01) |
| *B60W 60/00* | (2020.01) |
| *G05D 1/02* | (2020.01) |

(52) U.S. Cl.
CPC ........... *B60W 30/12* (2013.01); *G05D 1/0253* (2013.01); *B60W 10/04* (2013.01); *B60W 10/20* (2013.01); *B60W 2420/42* (2013.01); *B60W 2420/52* (2013.01); *G05D 1/0257* (2013.01)

(58) Field of Classification Search
CPC .. B60W 30/12; B60W 10/04; B60W 2420/52; B60W 2420/42; B60W 10/20; B60W 2556/25; B60W 2556/20; B60W 60/0053; B60W 2554/4041; B60W 50/045; G05D 1/0253; G05D 1/0257
See application file for complete search history.

(56) References Cited

U.S. PATENT DOCUMENTS

| | | | |
|---|---|---|---|
| 2005/0209748 A1 | 9/2005 | Watanabe et al. | |
| 2011/0261168 A1* | 10/2011 | Shima | ....................... G06T 7/70 348/47 |

(Continued)

FOREIGN PATENT DOCUMENTS

| | | | |
|---|---|---|---|
| JP | 2000-105898 A | 4/2000 | |
| JP | 2005-258846 A | 9/2005 | |

(Continued)

*Primary Examiner* — Abby Y Lin
*Assistant Examiner* — Hossam M Abd El Latif
(74) *Attorney, Agent, or Firm* — Maschoff Brennan

(57) ABSTRACT

A driving support apparatus is provided to improve accuracy of the driving support such as a notification to the driver and the vehicle control. In the apparatus, a common parameter indicating a location of a lane boundary is calculated for the vehicle control, based on an actual boundary line where a location of the lane boundary line existing at both sides of the vehicle is actually measured. A common error is defined as an error between the location of an estimated boundary indicated by the common parameter and a location of the actual boundary line. In the case where the common error is larger than or equal to a common threshold in which an amount of the common error is set in advance, the apparatus determines that the travelling road where the vehicle travels is branched and stops the vehicle control using the common parameter.

8 Claims, 10 Drawing Sheets

(56) References Cited

U.S. PATENT DOCUMENTS

| | | | |
|---|---|---|---|
| 2015/0227799 A1* | 8/2015 | Kataoka | G06K 9/00791 |
| | | | 382/199 |
| 2015/0310283 A1 | 10/2015 | Mori | |
| 2016/0272203 A1* | 9/2016 | Otake | B60W 50/14 |
| 2016/0327948 A1* | 11/2016 | Taguchi | G05D 1/0077 |
| 2018/0210453 A1* | 7/2018 | Sato | B60W 30/12 |
| 2018/0238696 A1* | 8/2018 | Takeda | B60W 30/095 |

FOREIGN PATENT DOCUMENTS

| | | |
|---|---|---|
| JP | 2006-172225 A | 6/2006 |
| JP | 2011-198110 A | 10/2011 |
| JP | 2015-210618 A | 11/2015 |

* cited by examiner

DRIVING SUPPORT APPARATUS

CROSS-REFERENCE TO RELATED APPLICATION

This application is based on and claims the benefit of priority from earlier Japanese Patent Application No. 2017-194558 filed Oct. 4, 2017, the description of which is incorporated herein by reference.

BACKGROUND

Technical Field

The present disclosure relates to a driving support apparatus that performs a predetermined control based on a location of a lane boundary line recognized by a lane recognition device.

Description of Related Art

As a related art document, Japanese patent Application Laid-Open Publication Number 2011-198110 discloses a driving support apparatus in which an on-vehicle camera captures a front area and a side area of a vehicle, thereby recognizing markings in the captured image. Then, the driving support apparatus estimates whether or not the vehicle departs from a lane boundary indicated by locations of the recognized markings. The driving support apparatus performs, based on the estimation, a notification process to notify the driver who is driving the vehicle, and a vehicle control such as a travelling speed control or a steering control.

However, in a case where the vehicle runs on a branched road, the marking location and the location of the lane boundary where the vehicle runs may appear similar. In this case, assuming that the recognized marking location is regarded as a current location of the lane boundary, and future location of the lane boundary is estimated by using the current location of the lane boundary, estimation accuracy may be degraded.

The present disclosure provides a technique that improves a notification to a driver of the vehicle and an accuracy of the driving support process.

One aspect of the present disclosure is a driving support apparatus mounted on a vehicle provided with an image capturing unit, a lane recognition unit, a travelling road calculation unit, a control process execution unit, an error calculation unit and a control changing unit.

The image capturing unit is configured to acquire a plurality of images captured by an imaging device, the imaging device periodically capturing, at a predetermined period, the area ahead of the vehicle with a predetermined image capturing range. The lane recognition unit is configured to recognize, for each of the images, a location and a shape of an actual boundary line as a lane boundary line existing in both sides of an own lane where the vehicle travels. The travelling road calculation unit is configured to estimate a location and a shape of the own lane by using the location and the shape of the actual boundary line recognized by the lane recognition unit, so as to calculate a travelling road parameter indicating the location and the shape of an estimated lane as the own lane which has been estimated. The control process execution unit is configured to perform a lane keep control as a vehicle control based on the location and the shape of the estimated lane indicated by a control parameter which is the travelling road parameter calculated by the travelling road calculation unit. The control changing unit is configured to change the vehicle control of the control process execution unit, based on the travelling road error calculated by the error calculation unit and an error threshold which is a predetermined threshold.

According to the above-described configuration, an accuracy of the driving support such as a notification to the driver and a vehicle control can be improved. It should be noted that the bracketed reference signs of individual means in this column and in the claims indicate correspondence to specific means in the embodiments described later as one aspect, and do not limit the technical scope of the present disclosure.

DETAILED DESCRIPTION OF THE PREFERRED EMBODIMENTS

Hereinafter, with reference to the drawings, embodiments of the present disclosure will be described.

1. Configuration

Figure 1:
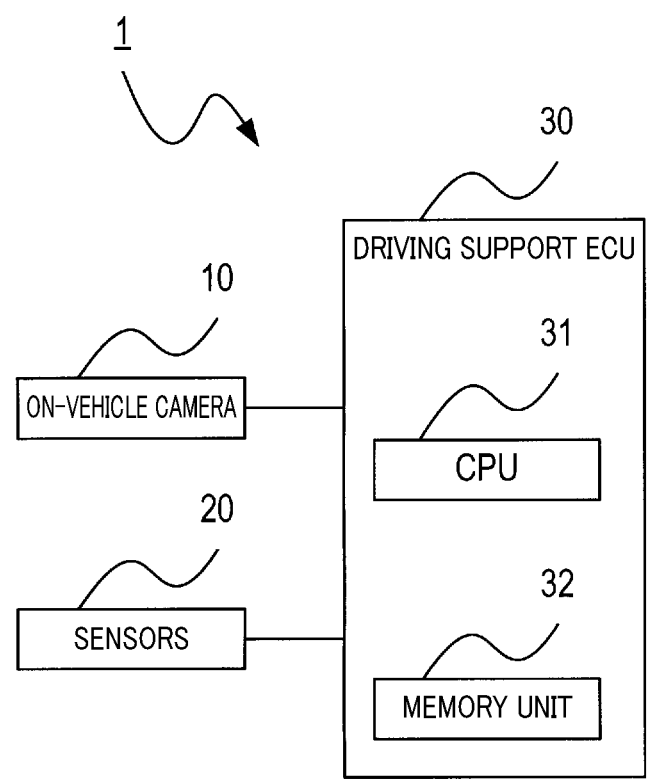
FIG. 1 is a block diagram showing an overall configuration of a driving support system of an embodiment of the present disclosure.

A driving support system 1 according to the present embodiment shown in FIG. 1 is provided in the vehicle, detecting stationary objects ahead of the vehicle, estimating a shape of the travelling road based on the detected stationary objects, and executing to various driving supports based on the estimated shape of the travelling road. Hereinafter, a vehicle provided with the driving support system 1 refers to an own vehicle. Note that stationary objects may include a guardrail provided in a road side other than markings painted on the road surface.

Figure 2:
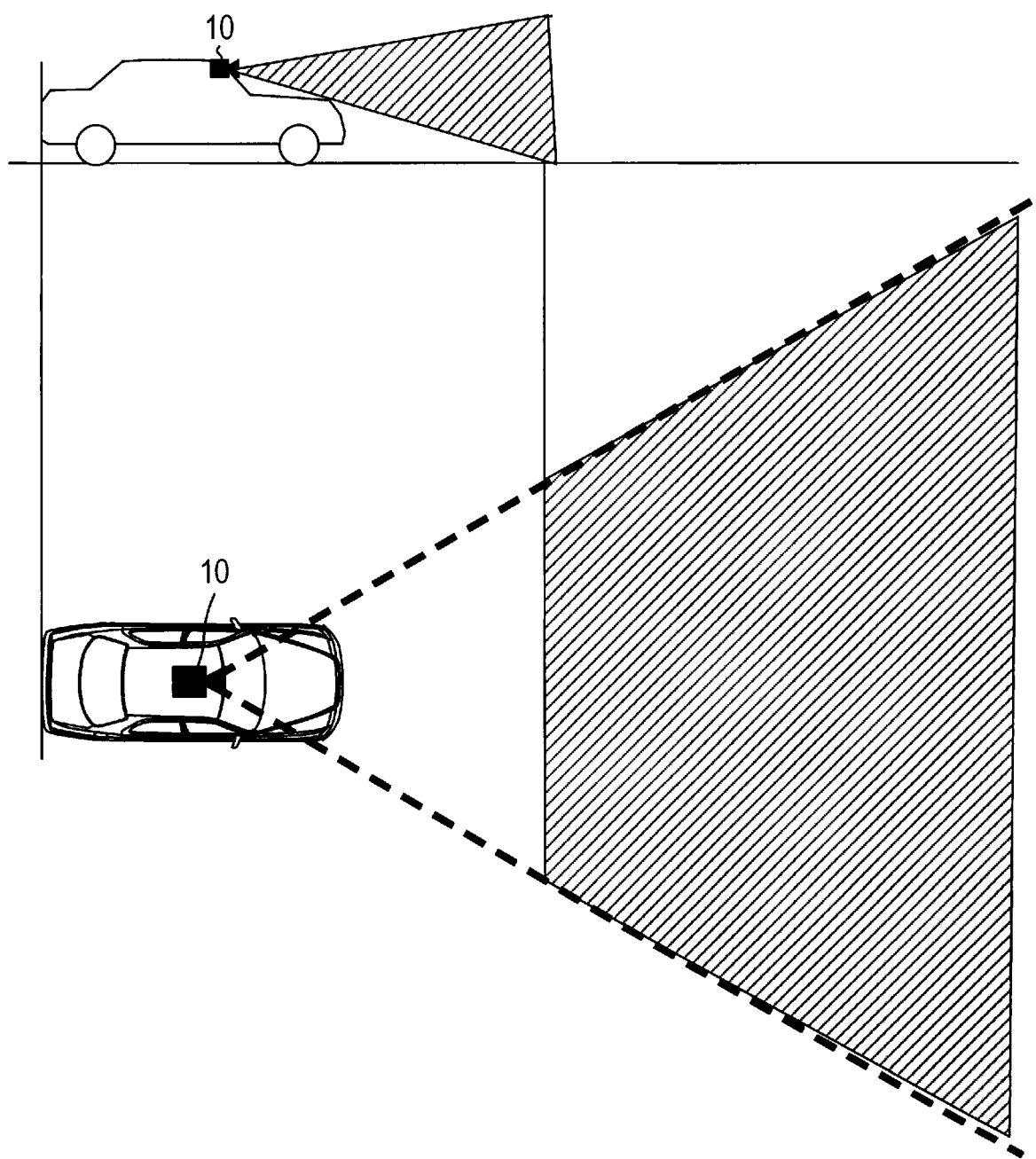
FIG. 2 is an explanatory diagram showing an image capturing range.

The driving support system 1 shown in FIG. 1 is provided with an on-vehicle camera 10, sensors 20 and a driving support apparatus 30. The on-vehicle camera 10 is configured of known CCD camera or CMOS camera using an image sensor composed of imaging devices such as two-dimensionally arranged CCD or CMOS elements. The on-vehicle camera 10 is configured such that captured image ahead of the own vehicle is supplied to the driving support apparatus 30 at a predetermined capturing period. Specifically, the on-vehicle camera 10 is attached to a center front side of the own vehicle. As shown in FIG. 2, the on-vehicle camera 10 captures an area spread ahead of the own vehicle with a predetermined angle range.

The sensors 20 are composed of various sensors including at least a vehicle speed sensor and a yaw rate sensor are mounted on the own vehicle, which detects state and behavior of the own vehicle. The sensors 20 includes at least a radar sensor to detect a preceding vehicle running ahead of the own vehicle. As the sensors 20, for example, a pitch angle sensor and a steering angle sensor or the like can be provided other than the above-described vehicle speed sensor, the yaw rate sensor and the radar sensor.

The driving support apparatus 30 is mainly configured of known microcomputer including semiconductor devices such as CPU 31, RAM, ROM and flash memory. Various functions of the driving support apparatus are accomplished by the CPU 31 in executing a program stored in the non-transitory tangible recording media. In this example, a memory unit 32 corresponds to the non-transitory tangible recording media that stores the program. By executing the program, methods corresponding to the program are executed. Note that the number of microcomputers that constitute the driving support apparatus 30 may be one or more. In the memory unit 32, an error threshold having a predetermined value has been stored.

The driving support apparatus 30 performs at least a preceding vehicle recognition process and a driving support process. The preceding vehicle recognition process and the driving support process are activated when the ignition switch of the own vehicle is turned ON, and repeatedly performed until the ignition switch is turned OFF. Also, a period where the driving support process is executed is not limited to the ON period of the ignition switch of the own vehicle, but may be an ON period where the driving support function is activated.

In the driving support process, an error threshold is used for determine a travelling road error indicating an estimation error of a travelling road parameter. The error threshold includes main thresholds and sub thresholds. Each of the main thresholds and the sub thresholds includes 4 types of thresholds including a common threshold, a long distance threshold, a short distance threshold, and an individual threshold. Here, in the same type thresholds among the 4 types thresholds included in each of the main thresholds and the sub thresholds, sub thresholds are set to have smaller values than the main thresholds values. Note that the common thresholds are used to determine an amount of common errors which will be described later, and the individual thresholds are used to determine an amount of the individual errors which will be described later. Similarly, the long distance thresholds are used to determine the long distance errors which will be described later, and the short distance thresholds are used to determine an the size of short distance errors which will be described later. Each threshold indicates distance, but may be other value corresponding to the distance. For example, a value calculated using a position and the number of pixels in the image can be used. Note that each threshold included in the error threshold corresponds to an execution threshold.

The driving support apparatus 30 accomplishes a driving support process which will be descried later by the CPU 31 executing the program. The methods that achieve various functions of the driving support apparatus 30 is not limited to the software, but may be accomplished by one or more hardware modules. For example, in the case where the above-described functions are accomplished by hardware, its electronic circuits may be accomplished by a digital circuit including logic circuits, or an analog circuit, or these combinations.

2. Process

<Preceding Vehicle Recognition Process>

The driving support apparatus 30 preforms a preceding vehicle recognition process. The preceding vehicle described here refers to a vehicle existing ahead of the own vehicle and existing on the travelling direction of the own vehicle. To recognize the preceding vehicle, a radar sensor included in the sensors 20 is used, for example. The method for recognizing the preceding vehicle running on the own lane is not limited to a method using the radar sensor, but any other known methods can be used including a pattern matching for a vehicle captured in the image, a shape recognition, a recognition based on a color determination, a recognition using machine learning or a deep learning, and a recognition using a distance based on estimation of distance and height using the structure from motion technique. When a preceding vehicle running on the own lane is recognized, the process calculates the location of the recognized preceding vehicle. When the preceding vehicle running on the own lane is not recognized, the process generates a result indicating no preceding vehicle is currently recognized. Note that a process in the preceding vehicle recognition process corresponds to a preceding vehicle recognition unit.

<Driving Support Process>

Figure 3:
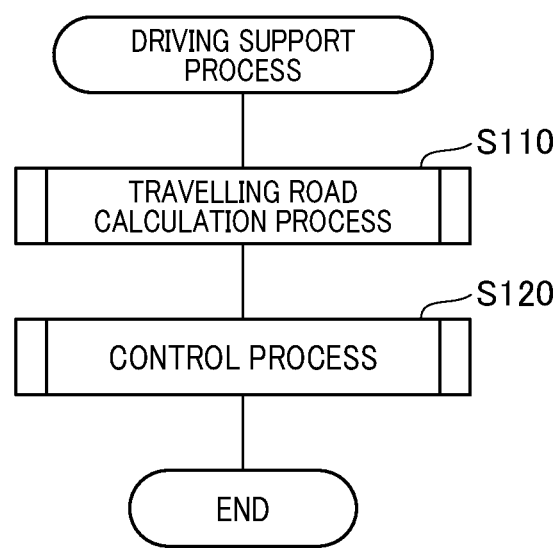
FIG. 3 is a flowchart showing a driving support process.

Next, with reference to FIG. 3, a driving support process executed by the driving support apparatus 30 will be described.

At step S110, the driving support apparatus 30 executes a travelling road calculation process in which a travelling road parameter and a travelling road error are calculated. The travelling road parameter indicates a location and a shape of the own lane where the own vehicle travels. The travelling road error is defined as an error between a location of the lane indicated by the travelling road parameter and an actually-measured location of the lane.

At step S120, the driving support apparatus 30 executes a control process and terminates the driving support process. The control process changes a control of the own vehicle based on the travelling road error and executes the changed control.

Note that the process at step S110 corresponds to a control process execution unit.

<Travelling Road Calculation Process>

Figure 4:
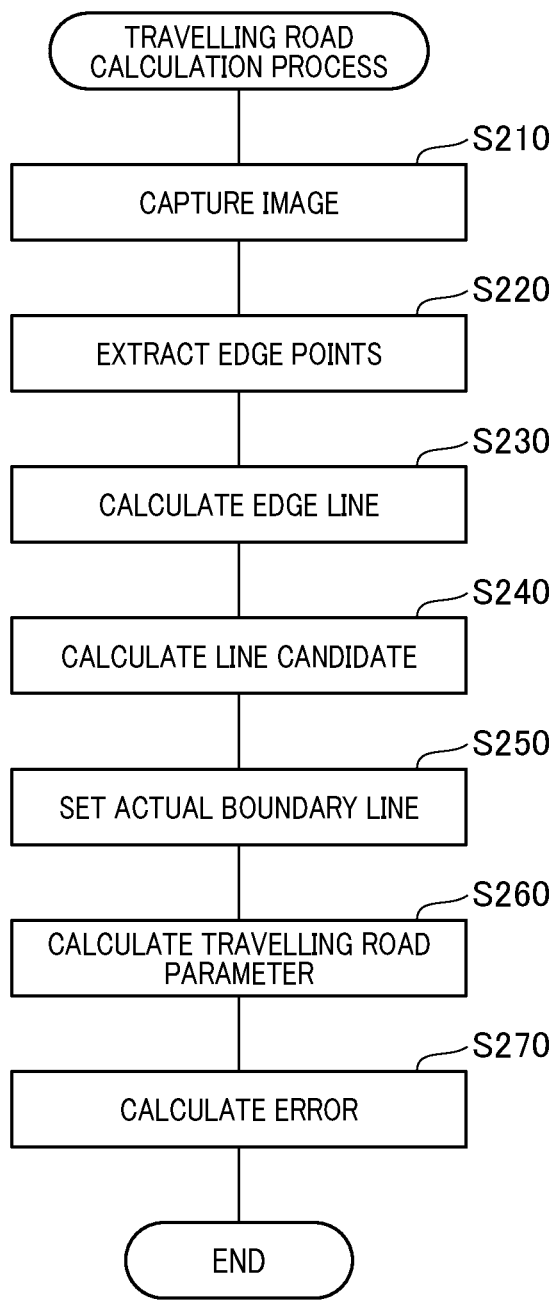
FIG. 4 is a flowchart showing a travelling road calculation process.

Next, with reference to a flowchart shown in FIG. 4, a travelling road calculation process executed by the driving support apparatus 30 at step S110 will be described.

Figure 5:
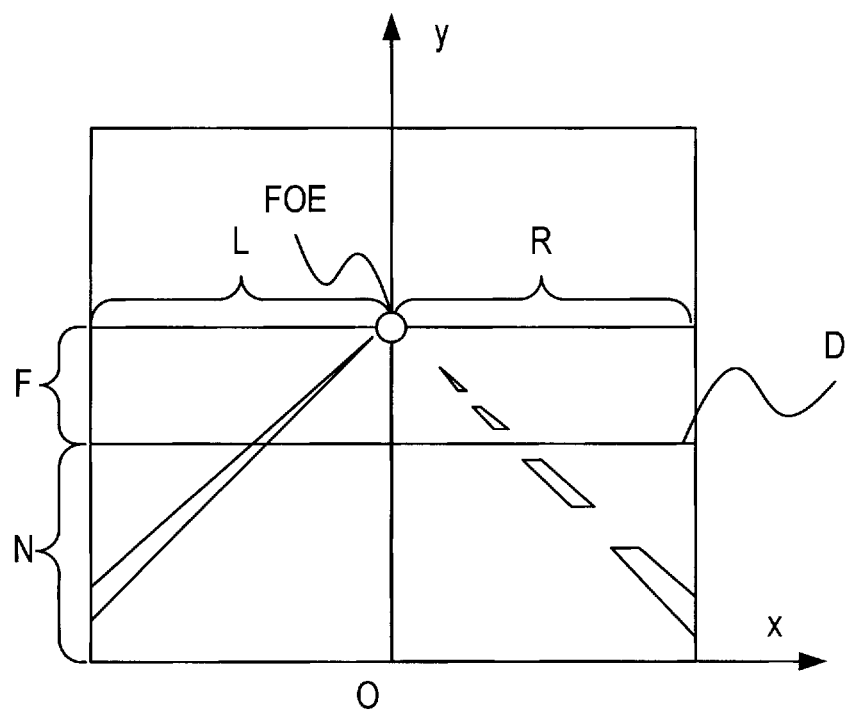
FIG. 5 is an explanatory diagram showing an example of a captured image.

At step S210, the driving support apparatus 30 acquires an image captured by the on-vehicle camera 10. FIG. 5 shows an example of the captured image. Hereinafter, a lower end of the center position of the image is defined as the origin O, the horizontal direction of the captured image is defined as X-axis direction and the vertical direction is defined as Y-axis direction. The captured image may be divided into a plurality of regions. Note that regions to be divided may be defined such that the left side with respect to the center position in the X-axis direction of the image is referred to as a left region L, and the right side thereof is referred to as a right region R, for example. A perspective boundary D is set as a boundary portion set in advance along the X-axis direction in the captured image and between the vanishing point FOE and the lower end of the captured image. Also, a region located in an upper region of the perspective boundary D may be set as a far region F, and a region lower than the boundary portion may be set as a near region N. Note that the location of the perspective boundary D may be set as a location on an image corresponding to a location at which the distance length between the camera position and the vanishing point is divided into an equal length.

Figure 6:
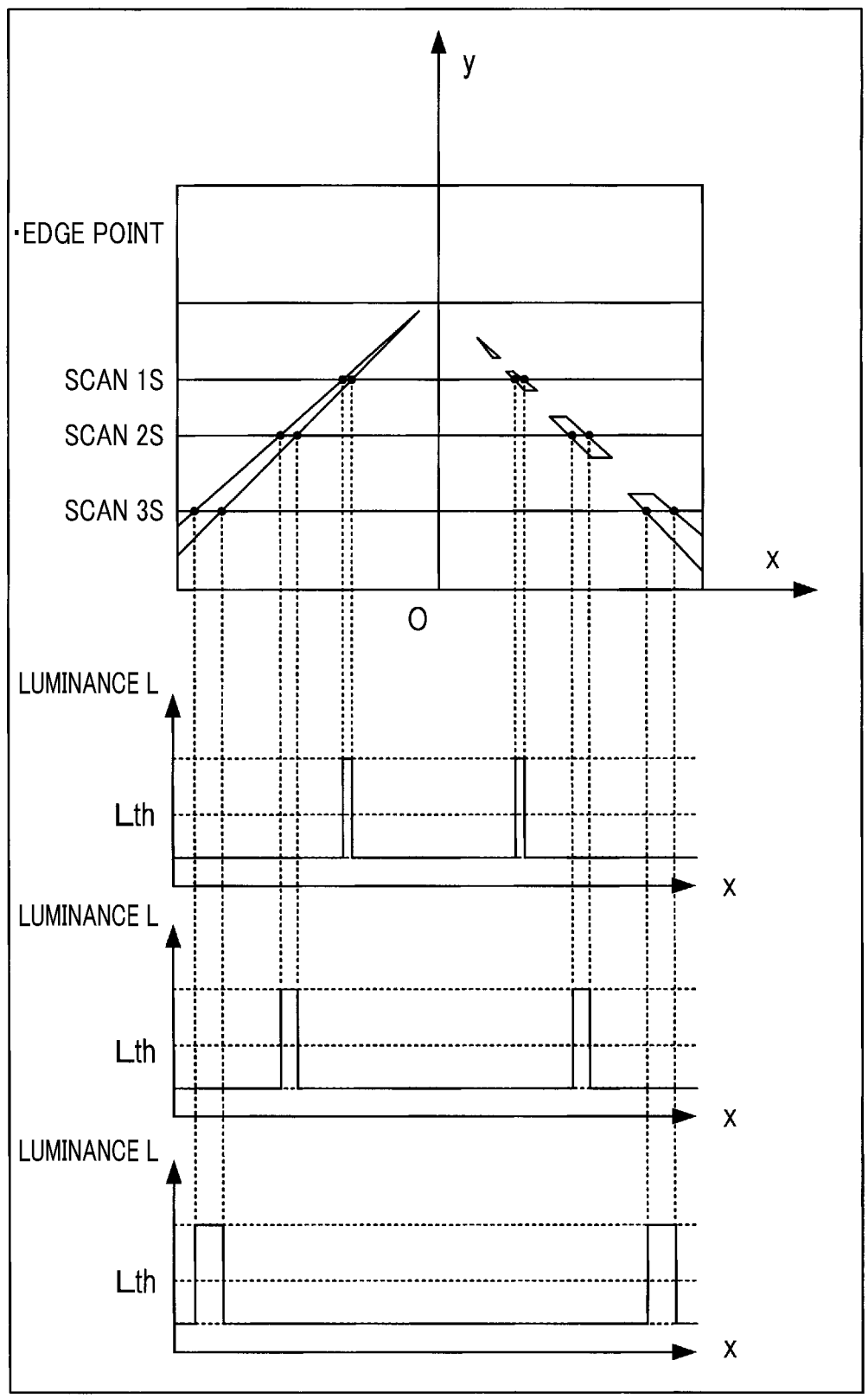
FIG. 6 is a diagram showing extraction of edge points.

At step S220, the driving support apparatus 30 extracts edge points. The edge points refer to points of a boundary between the marking and a portion other than the marking. The extraction of the edge points is executed in a manner shown in FIG. 6. In other words, the driving support apparatus 30 scans pixel values of pixels from the left to the right in the captured image. Based on the result of scanning, the driving support apparatus 30 recognizes a point where an absolute value of the edge intensity which is a difference between pixel values in the adjacent pixels is larger than a luminance threshold Lth as a predetermined threshold, to be an edge point.

Among the edge points, when scanning the luminance of the captured image, an edge point of which the pixel value changes to high value from low value towards other end portion from the origin O is referred to as an up edge point, and an edge point of which the pixel value changes to low value from high value is referred to as a down edge point.

At step S230, the driving support apparatus 30 calculates an edge line representing a distribution of the edge points. Specifically, the driving support apparatus 30 calculates an up edge line as an approximate line expressing a distribution of up edge points extracted at step S220, and a down edge line expressing a distribution of the down edge points. The calculation method of the edge line can be a known method such as a least square method, and a Hough transform.

At step S240, the driving support apparatus 30 extracts a region surrounded by adjacent up edge line and down edge line to be a line candidate. Here, to extract the line candidate, an up edge line closer to the origin O and a down edge line farther to the origin are paired, to extract a region surrounded by the up edge line and the down edge line which constitute the pair to be the line candidate. Further, when a distance between the up edge line and the down edge line in the pair is less than or equal to a predetermined distance, the up edge line and the down edge line which constitute the pair may be extracted as line candidates. Note that the predetermined distance may be a distance corresponding to a width of the marking such as a lane boundary indicated on the road.

At step S250, the driving support apparatus 30 selects, among line candidates calculated at step S240, lines indicating location of line candidates which are the closest to the origin O in the captured image, to be actual boundary lines 11a and 11b. In other words, the actual boundary lines 11a and 11b represent the location of a pair of lane boundary to be detected in both sides of the own vehicle. The location of the line candidate refers to a location of a up edge line that constitutes an up edge line, for example.

At step S260, the driving support apparatus 30 calculate the travelling road parameter based on the actual boundary lines 11a and 11b which have been set ate step S250. Specifically, the driving support apparatus 30 calculates the travelling road parameter indicating the location and the shape of the own lane with respect to the own vehicle, using the Kalman filter with up edge points as observation values. As observation values, up edge points are used. However, in the case where locations of the line candidates are defined as locations of the down edge points that constitute the line candidates, the down edge points may be set as the observation values. In other words, locations of the line candidates and the observation values are set to be correlated to each other.

The travelling road parameter includes an offset yc, a lane inclination φ, a pitching amount β, a curvature ρ, and a lane width W1. The offset yc is defined as a distance from the y-axis to the center of the x-axis of the travelling road in a captured image such as shown in FIG. 5, representing a displacement of the own vehicle in the travelling to road width direction. In other words, when the own vehicle is running in the center of the travelling road, the offset yc becomes 0. The lane inclination φ refers to an inclination of the tangent of the center line with respect to the front direction of the own vehicle, where the center line is defined as a virtual line passing thorough the center of the actual boundary lines 11a and 11b in the left and right sides, the center line representing a yaw angle of the vehicle. The pitching amount β refers to a pitch angle of the own vehicle with respect to the travelling road. The curvature ρ refers to the curvature of the center line. The lane width W1 refers to an interval between the left lane and the right lane in the x-axis direction, indicating a width of the travelling road. Note that the estimation of the travelling road parameter using the Kalman filter is a known technique so that detailed explanation thereof is omitted here.

Figure 7:
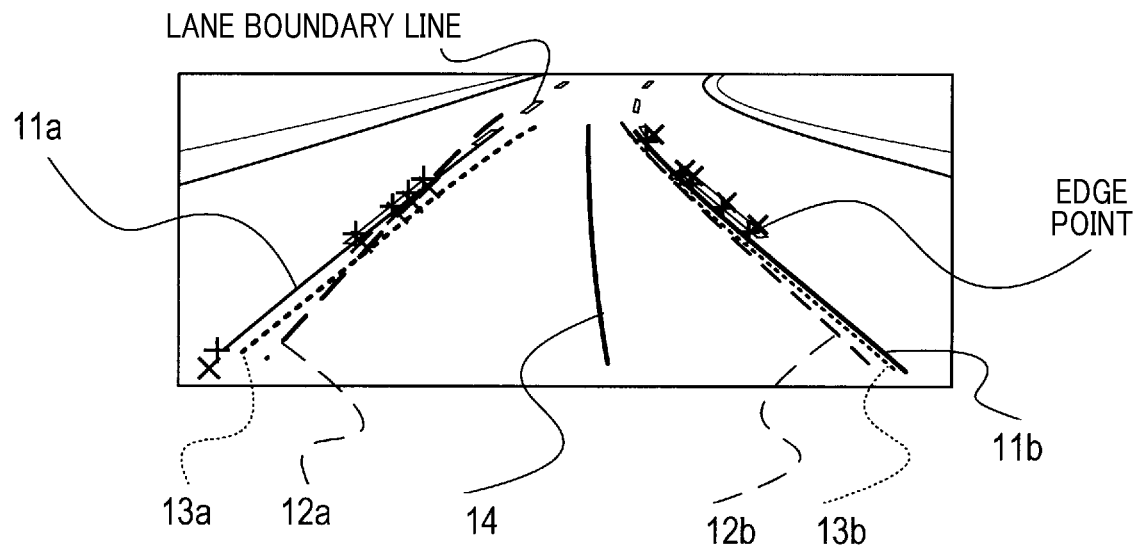
FIG. 7 is a diagram showing an example of location of an estimated boundary calculated by a travelling road calculation process.

The travelling road parameter is categorized into a common parameter and an individual parameter. The common parameter is calculated as follows. As shown in FIG. 7, the driving support apparatus 30 acquires the locations of the actual boundary lines 11a and 11b of the own vehicle which have been set at step S250. The driving support apparatus 30 calculates, assuming that a pair of actual boundary lines 11a and 11b located in the both sides of the own lane have the same shape in a bird's eye view image where an image of the own vehicle when viewed from the above is projected by coordinate conversion, the location and the shape of the base line 14 which is a virtual line located to have equal distance to each of the pair of actual boundary lines 11a and 11b. Then, the driving support apparatus 30 calculates the parameter indicating the location of the shape of the base line as the common parameter.

Further, the individual parameter is calculated as follows. As shown in FIG. 7, the driving support apparatus 30 sets either one side of both sides (e.g. left side) of the own lane to be a first side, and sets the other side (e.g. right side) to be the second side.

The driving support apparatus 30 estimates the location of the lane boundary based on the location of a first actual line which is an actual boundary line detected in the first side. Note that the estimated lane boundary is referred to as a first estimated boundary. The driving support apparatus 30 determines the parameter indicating the location and the shape of the first estimated boundary to be a first parameter.

Similarly, the driving support apparatus 30 estimates the location of the lane boundary based on the location of a second actual line which is an actual boundary line in the second side. Note that the estimated lane boundary is referred to as a second estimated boundary. The driving support apparatus 30 determines the parameter indicating the location and the shape of the second estimated boundary to be a second parameter.

Figure 8:
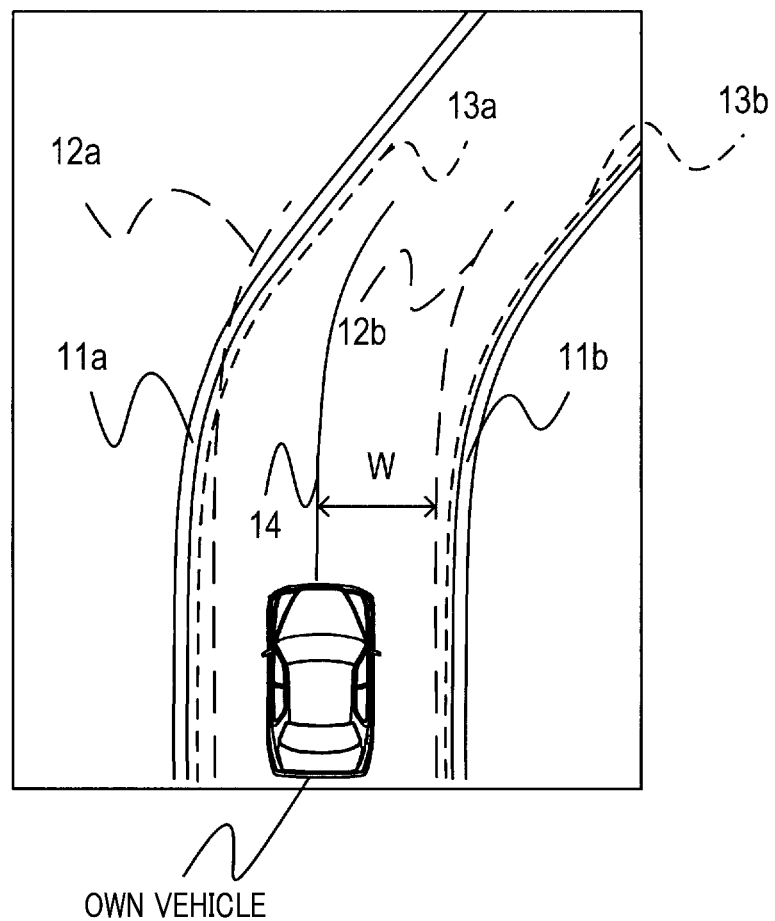
FIG. 8 is a bird's eye view showing a travelling road where the vehicle travels.

With reference to FIG. 8, an example of a location of the estimated boundary calculated using a common parameter and an individual parameter will be described. In the case where the actual boundary lines 11a and 11b are present in both respective sides of the own lane where the own vehicle travels on a right-hand curved road shown in FIG. 8, the following travelling road parameter and an estimated boundary will be calculated.

Specifically, the common parameter indicates the base line 14 located an equal distance from each of the actual boundary lines 11a and 11b in the vehicle width direction. Then, a portion located a predetermined width W apart from a portion expressed by the common parameter is estimated to be location of the lane boundary, and the estimated boundaries 12a and 12b are set. For a distance between the location expressed by the common parameter and the locations of the estimated boundaries 12a and 12b, a predetermined lane width may be set, for example.

The individual parameter is calculated based on each of the actual boundary lines 11a and 11b. Specifically, the estimated boundary 13a is calculated from the actual boundary line 11a, and the estimated boundary 13b is calculated from the actual boundary line 11b.

In other words, the common parameter is defined as a parameter calculated from a pair of actual boundary lines, and the individual parameter is defined as two parameters calculated for each of the actual boundary lines. Accordingly, the individual parameters are sensitive with respect to a change in the actual boundary line more than that of the common parameter.

At S270, the driving support apparatus 30 calculates the travelling road error which is a positional error between the location of the lane boundary line expressed by the travelling road parameter and the location of the lane boundary line on the image in the vehicle width direction. The calculation of the travelling road error is performed in the following manner. The driving support apparatus 30 sets a plurality of detection lines which are lines along the x-axis direction of the captured image at a predetermined interval in the y-axis direction in the captured image shown in FIG. 5. However, in each of the far region F and the near region N of the captured image shown in FIG. 5, at least one detection line is set. Then, differences between the estimated boundaries on the detection lines which have been set and the locations so of the lane boundaries are calculated as errors of the plurality of travelling road errors.

A plurality of travelling road errors are categorized into the common error and the individual error depending on types of estimated boundaries. Note that the estimated boundary refers to types of parameters used for calculating the estimated boundaries.

The common error refers to a travelling road error between the estimated boundaries 12a and 12b calculated from the common parameter and the actual boundary lines 11a and 11b. The individual error refers to a travelling road error between the estimated boundaries 13a and 13b calculated from the individual parameter and the actual boundary lines 11a and 11b. The individual error calculated using the first parameter is referred to as a first error, and an individual error calculated using the second parameter is referred to as the second error.

The common error is categorized into a far distance error and a near distance error depending on the location of the detection line in the calculated travelling road error. The far distance error refers to a common error calculated at the detection line which is set in the far region F in the captured image.

The near distance error refers to a common error calculated at the detection line which is set in the near region N in the captured image. That is, the common error includes at least one near distance error and at least one far distance error.

Note that a process at step S210 corresponds to an image acquiring unit, processes at steps S220 to S250 correspond to a lane recognition unit, a process at step S260 corresponds to a travelling road calculation unit, a common parameter calculation unit and an individual parameter calculation unit, a process at step S270 corresponds to an error calculation unit, a common error calculation unit, an individual error calculation unit, a first error calculation unit and a second error calculation unit.

<Control Process>

Figure 9:
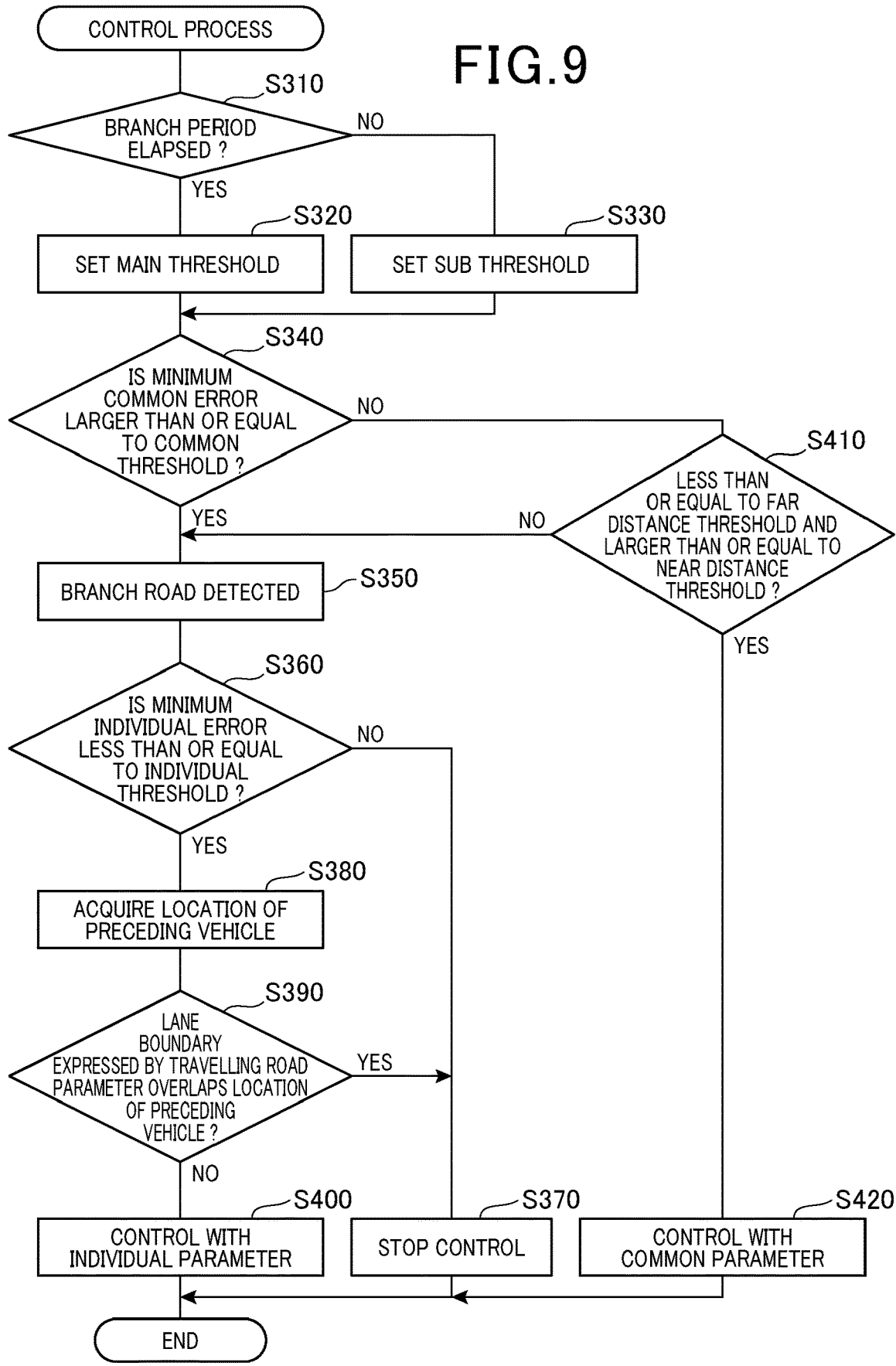
FIG. 9 is a flowchart showing a control process.

Next, with reference to a flowchart shown in FIG. 9, a control process executed by the driving support apparatus 30 at step S120 will be described.

At step S310, the driving support apparatus 30 determines whether or not a branch period set in advance has elapsed from a time at which a branch was determined in an area where the own vehicle travels. The determination whether or not the branch is present in an area where the own vehicle travels is executed at step S350 which will be described later.

When it is determined that the branch period has elapsed at step S310, the process moves to step S320. At step S320, the driving support apparatus 30 acquires a threshold indicating a distance included in the main thresholds from the memory unit 32, and sets the acquired threshold to be an error threshold. Then the driving support apparatus 30 proceeds to step S340.

On the other hand, at step S310, when it is determined that the branch period has not elapsed from the time where the branch was determined, the process proceeds to step S330. At step S330, the driving support apparatus 30 acquires, from the memory unit 32, a threshold indicating a distance included in the sub thresholds and sets the acquired threshold to be an error threshold. Then driving support apparatus 30 proceeds to step S340.

Comparing the main thresholds and the sub thresholds stored in the memory unit 32, the sub thresholds are set to be smaller than the main thresholds. Hence, during a period where the branch period elapses after the determination in which a branch is present in an area where the own vehicle travels through the processes of steps S310 to S330, the error threshold is set to be smaller.

At step S340, the driving support apparatus 30 determines whether or not a minimum common error is larger than or equal to the common threshold set in the processes at steps S320 to S330. Note that the minimum common error refers to a minimum value in the common errors calculated at step S270.

At step S340, when the process determines that the minimum common error is larger than or equal to the common threshold, the process proceeds to step S350. At step S350, the driving support apparatus 30 determines that the own lane where the own vehicle travels is branched.

At step S360, the driving support apparatus 30 determines whether or not a minimum individual error is the individual threshold or less. Note that the minimum individual error refers to a minimum value in the individual errors calculated at step S270.

When it is determined that the minimum individual error is not the individual threshold, the process proceeds to step S370. At step S370, the driving support apparatus 30 performs a process for terminating a control using a travelling road parameter as a control parameter, and terminates the control process.

On the other hand, when it is determined that the minimum individual error is smaller than or equal to the individual threshold at step S360, the process proceeds to step S380. At step S380, the driving support apparatus 30 acquires a position of the preceding vehicle recognized by a preceding vehicle recognition process.

At step S390, the process determines whether the location of the lane boundary expressed by the travelling road parameter and the location of the preceding vehicle are overlapped. When the process determines that the location of the lane boundary expressed by the travelling road parameter and the location of the preceding vehicle are overlapped, the process moves to step S370 and proceeds to subsequent steps.

At step S390, when it is determined that the location of the lane boundary expressed by the travelling road parameter and the location of the preceding vehicle are not overlapped, the process proceeds to step S400. Even in the case where the preceding vehicle is not recognized, the process proceeds to step S400.

In other words, step S390 determines whether or not the travelling road parameter is correctly calculated by using the location of the preceding vehicle. This is based on the assumption that the preceding vehicle is not present outside the location of the lane boundary. When the location of the preceding vehicle and the lane boundary expressed by the travelling road parameter are overlapped, the process determines that an error has occurred in the calculation of the traveling road parameter. Then the process performs a process of termination of vehicle control which uses the traveling road parameter having such an error.

At step S400, the driving support apparatus 30 performs a vehicle control using the individual parameter as a control parameter and terminates the process. For the individual parameter, the first error is compared with the second error and a parameter having smaller error may be selected. Further, control of the own vehicle using the individual parameter corresponds to a lane keep control in which the own vehicle is controlled to travel along the road determined by the position and the shape of the estimated boundaries 13a and 13b expressed by the individual parameter.

At step S340, when it is determined that the minimum common error is neither larger than nor equal to the common threshold, the process proceeds to step S410. At step S410, the driving support apparatus 30 determines whether or not the minimum value of the far distance error is lower than or equal to the far distance threshold and the minimum value of the near distance error is larger than or equal to the near distance threshold. Note that the far distance error and the near distance error correspond to the far distance error and the near distance error calculated at step S270 respectively.

Here, as long as the locations of the estimated boundaries 12a and 12b expressed by the common parameter and the locations of the actual boundaries are correctly estimated, the near distance error is smaller than the far distance error. Meanwhile, in the case where the estimated boundaries 12a and 12b expressed by the common parameter are incorrectly estimated, and the estimated boundaries 12a and 12b and the actual boundaries 11a and 11b cross each other in the far distance range F, the far distance error is smaller than the near distance error.

Hence, the driving support apparatus 30 determines whether or not the minimum value of the far distance error is lower than or equal to the far distance threshold and the minimum value of the near distance error is larger than or equal to the near distance threshold, whereby an accuracy of a determination whether or not the estimation is correctly done can be performed.

At step S410, when it is determined that the far distance error is lower than or equal to the far distance threshold and the near distance error is larger than or equal to the near distance threshold, the driving support apparatus 30 proceeds to step S420. At step S420, the driving support apparatus 30 controls the own vehicle using the common parameter as the control parameter, and terminates the process. Note that a control of the own vehicle using the common parameter corresponds to a lane keep control in which the own vehicle is controlled to travel along the road determined by the position and the shape of the estimated boundaries 12a and 12b expressed by the common parameter.

On the other hand, when it is determined that the far distance error is neither lower than nor equal to the far distance threshold and the near distance error is nether larger than nor equal to the near distance threshold, the driving support apparatus 30 proceeds to step S350 and executes subsequent steps. Note that the process at S390 corresponds to a preceding vehicle determination unit, and processes of steps S340, S360, S390 and S410 correspond to a control changing unit.

3. Effects and Advantages

According to the above-described embodiments, the following effects and advantages can be obtained.

(1) According to the driving support system 1 of the present embodiment, accuracy of the driving support such as notification to the driver or a vehicle control based on locations of the detected lane boundaries can be improved. In other words, when an error between the locations of the lane boundaries indicated by a pair of actual boundary lines existing in the both sides of the own vehicle and the locations of the estimated boundaries indicated by the common parameter is a predetermined error threshold or more, a vehicle control based on the lane boundary expressed by the common parameter is terminated. Thus, since the vehicle control based on the common parameter including a common error is not performed when large common error of the common parameter is detected, accuracy of the driving support can be improved.

Figure 10:
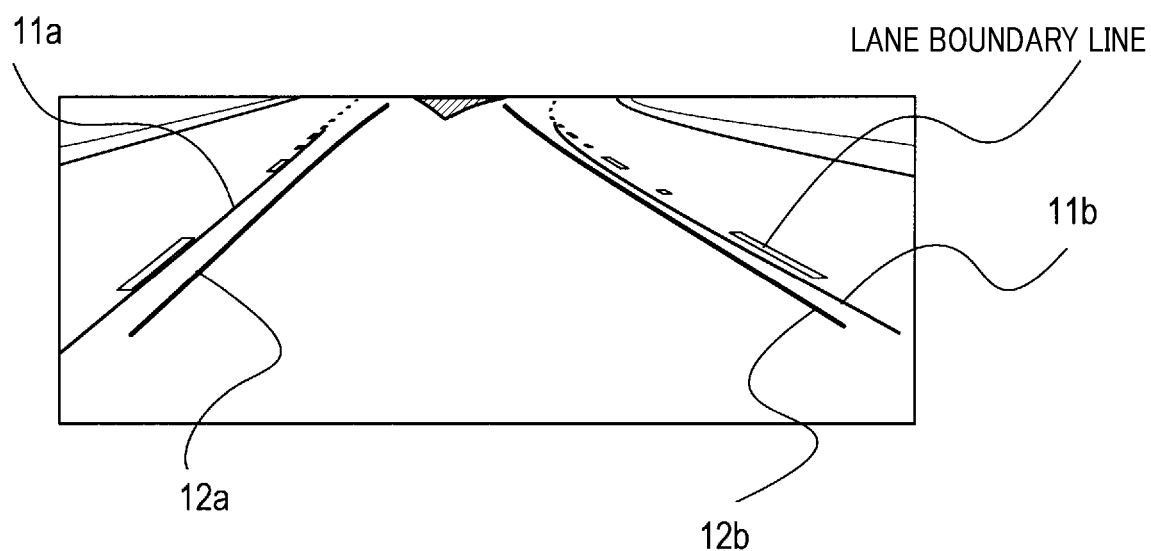
FIG. 10 is an explanatory diagram of a branched road branched to both sides, showing an image captured by an imaging device and each travelling road parameter.

For example, as shown in FIG. 10, in a branched road branched to both road sides, the process calculates, based on the actual boundary lines 11a and 11b, the locations and the shape of the estimated boundaries 12a and 12b estimated by using the common parameter. Here, in the branched road, since the width of the lane is expanded the locations of the estimated boundaries 12a and 12b depart from the actual boundary lines 11a and 11b. Therefore, an amount of error between the actual boundary lines 11a and 11b and the estimated boundaries 12a and 12b becomes large, thereby stopping a vehicle control based on the common parameter which is used for calculating the estimated boundaries 12a and 12b.

(2) According to the driving support system 1 of the present embodiment, when the common error is larger than the common threshold, the process determines a magnitude relationship between the individual error and the individual threshold. Then, when the individual error is smaller than the individual threshold, the vehicle control using the common parameter is changed to vehicle control using an individual parameter. The individual parameter is sensitive to the locations and shape of the actual boundary lines, more than that of the common parameter so that it is likely to respond to a rapid change of the shape of the travelling road.

Figure 11:
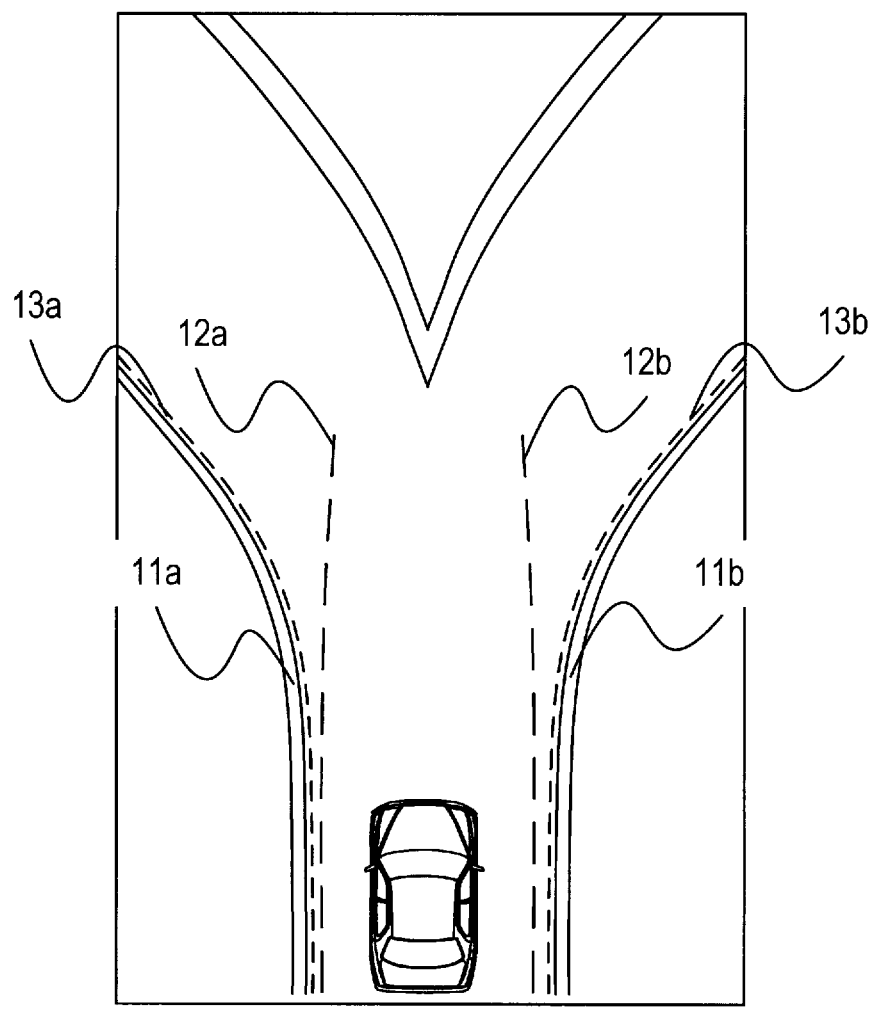
FIG. 11 is a bird's eye view of a branched road branched to both sides, showing a travelling road parameter to be calculated.
Figure 12:
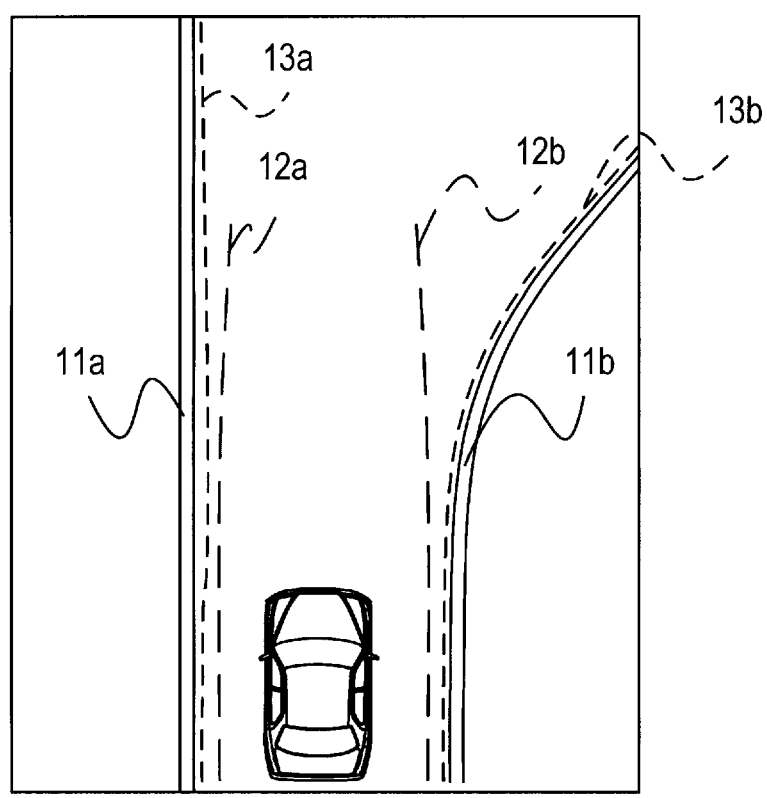
FIG. 12 is a bird's eye view of a branched road branched to one side, showing a travelling road parameter to be calculated.

Further, as shown in FIG. 11, in the branched road branched to both sides of the road, the locations and the shape of the estimated boundaries 12a and 12b which are estimated using the common parameter are different from the locations and shape of the actual boundary lines 11a and 11b. However, the location and the shape of the estimated boundaries 13a and 13b estimated using the individual parameter are equal to the locations and the shape along the actual boundary lines 11a and 11b. This is because the common parameter is calculated based on the locations of the pair of actual boundary lines 11a and 11b, but the individual parameter is calculated based on each of the locations of the actual boundary lines 11a and 11b. In FIG. 11, a branched road branched to both sides of the road is exemplified. However, as shown FIG. 12, a branched road branched to only one side of the road is applicable. Similarly, the locations and the shape of the estimated boundaries 13a and 13b expressed by the individual parameter are calculated along the locations and the shape of the actual boundary lines 11a and 11b.

When the common error is neither lower than nor equal to the common threshold, the common parameter is used to perform the vehicle control. Thus, when assuming that either one actual boundary line between the actual boundary lines in both sides of the vehicle is not recognized correctly due to blur or the like, since the calculation is made for both sides, the influence of errors can be minimized compared to the case where the calculation is made for either one side. Accordingly, the vehicle can be stably controlled.

4. Other Embodiments

Embodiments of the present disclosure have been described so far. The present disclosure is not limited to the above-described embodiments, but various modifications can be made.

(1) According to the above-described embodiments, a lane keep control is performed at steps S400 and S420. Also, the lane keep control is terminated at step S370. Note that the lane keep control controls the own vehicle to travel in a direction along the travelling road parameter, but the lane keep control is not limited to this control. For example, when the own vehicle departs from the location of the lane boundary expressed by the travelling road parameter, in this configuration, the driver driving the own vehicle may be notified that the own vehicle is going to depart from the lane boundary location.

(2) A plurality of functions included in a single element of the above-described embodiments may be achieved by a plurality of elements, or one function included in a single element may be achieved by a plurality of elements. A plurality of functions included in a plurality of elements may be achieved by a single element, or a function achieved by a plurality of elements may be achieved by a single element. Also, a part of configurations of the above-described embodiments can be omitted. At least part of the above-described configuration may be added to other configuration of the above-described embodiments, or may replace other configuration of the above-described embodiments. It should be noted that various aspects inherent in the technical ideas identified by the scope of claims are embodiments of the present disclosure.

(3) The present disclosure may be accomplished with various modes other than the above-described driving support ECU, including a system having the driving support ECU, a program having the computer serve as a driving support ECU, a non-transitory tangible recording media such as semiconductor memory device, in which the program is stored, and a driving support method.

What is claimed is:

1. A driving support apparatus mounted on a vehicle comprising:
an image capturing unit configured to acquire a plurality of images captured by an imaging device, the imaging device periodically capturing, at a predetermined period, ahead of the vehicle with a predetermined image capturing range;
a lane recognition unit configured to recognize, for each of the images, a location and a shape of actual boundary lines as lane boundary lines existing on both sides of an own lane where the vehicle travels;
a travelling road calculation unit configured to estimate a location and a shape of the own lane by using the location and the shape of an actual boundary line recognized by the lane recognition unit, so as to calculate a travelling road parameter indicating the location and the shape of an estimated lane as the own lane which has been estimated;
a control process execution unit configured to perform a lane keep control as a vehicle control based on the location and the shape of the estimated lane indicated by a control parameter, which is the travelling road parameter calculated by the travelling road calculation unit;
an error calculation unit configured to calculate a travelling road error as an error between an estimated position which is a position of the own lane indicated by the estimated lane, and an actual location, which is a location of the own lane indicated by the actual boundary line; and
a control changing unit configured to change the vehicle control of the control process execution unit, based on the travelling road error calculated by the error calculation unit and an error threshold which is a predetermined threshold, wherein
the travelling road calculation unit includes a common parameter calculation unit configured to calculate, based on a location of a pair of actual boundary lines detected at both sides of the own lane, a location and a shape of a base line, which is a virtual line located to have equal distance to each of a pair of lane boundary lines assuming that the pair of lane boundary lines located on the both sides of the own lane have the same shape, to be the travelling road parameter;
the error calculation unit includes a common error calculation unit configured to calculate an error between a location of the base line and a location of a virtual line located to have equal distance to each of the pair of actual boundary lines, to be the travelling road error;
the travelling road calculation unit includes an individual parameter calculation unit;
the individual parameter calculation unit includes a first parameter calculation unit and a second parameter calculation unit, where either one side between the both sides of the own lane is defined as a first side and the other side is defined as a second side;
the first parameter calculation unit is configured to calculate a first parameter to be the travelling road parameter, the first parameter indicating a location and a shape of a first estimated boundary, which is a boundary of the estimated lane estimated based on a location of a first actual line defined as an actual boundary line detected at the first side;

the second parameter calculation unit is configured to calculate a second parameter to be the travelling road parameter, the second parameter indicating a location and a shape of a second estimated boundary, which is a boundary of the estimated lane estimated based on a location of a second actual line defined as an actual boundary line detected at the second side;

the error calculation unit includes an individual error calculation unit;

the individual error calculation unit includes a first error calculation unit and a second error calculation unit;

the first error calculation unit is configured to calculate a first error to be the travelling road error, the first error being an error between a location of the first estimated boundary indicated by the first parameter and a location of the first actual line; and the second error calculation unit is configured to calculate a second error to be the travelling road error, the second error being an error between a location of the second estimated boundary indicated by the second parameter and a location of the second actual line.

2. The driving support apparatus according to claim 1, wherein the travelling road calculation unit includes a common parameter calculation unit and an individual parameter calculation unit;

the common parameter calculation unit is configured to calculate, based on a location of a pair of actual boundary lines detected at both sides of the own lane, a location and a shape of a base line which is a virtual line located to have equal distance to each of a pair of lane boundary lines to be the travelling road parameter, assuming that the pair of lane boundary lines located in the both sides of the own lane have the same shape;

the individual parameter calculation unit includes a first parameter calculation unit and a second calculation unit, where either one side between the both sides of the own lane is defined as a first side and the other side is defined as a second side;

the first parameter calculation unit is configured to calculate a first parameter to be the travelling road parameter, the first parameter indicating a location and a shape of a first estimated boundary which is a boundary of the estimated lane estimated based on a location of a first actual line defined as the actual boundary line detected at the first side;

the second parameter calculation unit is configured to calculate a second parameter to be the travelling road parameter, the second parameter indicating a location and a shape of a second estimated boundary which is a boundary of the estimated lane estimated based on a location of a second actual line defined as the actual boundary line detected at the second side;

the error calculation unit includes a common error calculation unit and an individual error calculation unit;

the common error calculation unit is configured to calculate an error between a location of the base line indicated by the travelling road parameter calculated by the common parameter calculation unit and a location of a virtual line located to have equal distance to each of the pair of actual boundary lines, to be the travelling road error;

the individual error calculation unit includes a first error calculation unit and a second error calculation unit;

the first error calculation unit is configured to calculate a first error to be the travelling road error, the first error being an error between a location of the first estimated boundary indicated by the first parameter and a location of the first actual line;

the second error calculation unit is configured to calculate a second error to be the travelling road error, the second error being an error between a location of the second estimated boundary indicated by the second parameter and a location of the second actual line; and the control changing unit is configured to change, based on the travelling road error calculated by the error calculation unit and a common threshold which is a predetermined threshold, the control parameter used for the vehicle control performed by the control process execution unit, to be the travelling road parameter calculated by either the common parameter calculation unit or the individual parameter calculation unit.

3. The driving support apparatus according to claim 2, wherein the control changing unit is configured to compare the first error with the second error and set a smaller error of the first parameter and the second parameter, to be the control parameter.

4. The driving support apparatus according to claim 1, wherein the control changing unit includes an executing changing unit configured to stop the lane keep control when the travelling road error calculated by the error calculation unit is larger than or equal to an execution threshold which is a predetermined threshold.

5. The driving support apparatus according to claim 1, wherein the control changing unit is configured to change the error threshold to be a sub threshold which is smaller than the error threshold, during a period where a branch period which is a predetermined time elapses from a time when the vehicle control using the travelling road parameter is changed.

6. The driving support apparatus according to claim 1, further comprising:

a preceding vehicle recognition unit that recognizes a preceding vehicle existing ahead of the vehicle; and a preceding vehicle determination unit that determines whether a location of the lane boundary line in the estimated lane indicated by the travelling road parameter and a location of the preceding vehicle recognized by the preceding vehicle recognition unit are overlapped, wherein the control changing unit is configured to stop at least the lane keep control using the travelling road parameter, when the preceding vehicle determination unit determines that the location of the lane boundary line in the estimated lane and the location of the preceding vehicle are overlapped.

7. A computer-implemented method for providing driving support for a vehicle, the computer-implemented method comprising:

acquiring a plurality of images captured by an imaging device, the imaging device periodically capturing, at a predetermined period, ahead of the vehicle with a predetermined image capturing range;

recognizing, for each of the images, a location and a shape of actual boundary lines as lane boundary lines existing on both sides of an own lane where the vehicle travels;

estimating a location and a shape of the own lane by using the location and the shape of an actual boundary line that is recognized, so as to calculate a travelling road parameter indicating the location and the shape of an estimated lane as the own lane which has been estimated;

performing a lane keep control as a vehicle control based on the location and the shape of the estimated lane indicated by a control parameter, which is the travelling road parameter that is calculated;

calculating a travelling road error as an error between an estimated position, which is a position of the own lane indicated by the estimated lane, and an actual location, which is a location of the own lane indicated by the actual boundary line; and changing the vehicle control based on the travelling road error that is calculated and an error threshold which is a predetermined threshold, wherein estimating the location and the shape of the own lane comprises calculating based on a location of a pair of actual boundary lines detected at both sides of the own lane, a location and a shape of a base line, which is a virtual line located to have equal distance to each of a pair of lane boundary lines assuming that the pair of lane boundary lines located on the both sides of the own lane have the same shape, to be the travelling road parameter; and calculating the travelling road error comprises calculating an error between a location of the base line and a location of a virtual line located to have equal distance to each of the pair of actual boundary lines, to be the travelling road error.

8. The computer-implemented method according to claim 7, wherein:

one side of the own lane is defined as a first side and the other side of the own lane is defined as a second side, and estimating the location and the shape of the own lane comprises:

calculating a first parameter to be the travelling road parameter, the first parameter indicating a location and a shape of a first estimated boundary, which is a boundary of the estimated lane estimated based on a location of a first actual line defined as an actual boundary line detected at the first side; and calculating a second parameter to be the travelling road parameter, the second parameter indicating a location and a shape of a second estimated boundary, which is a boundary of the estimated lane estimated based on a location of a second actual line defined as an actual boundary line detected at the second side; and calculating the travelling road error comprises:

calculating a first error to be the travelling road error, the first error being an error between a location of the first estimated boundary indicated by the first parameter and a location of the first actual line; and calculating a second error to be the travelling road error, the second error being an error between a location of the second estimated boundary indicated by the second parameter and a location of the second actual line.

* * * * *